Feb. 11, 1969
J. D. OSBORNE
3,427,537
DIRECT MEASURING MOISTURE APPARATUS INCLUDING
REPLACEABLE SCALE DIALS
Filed May 5, 1965
Sheet 1 of 2
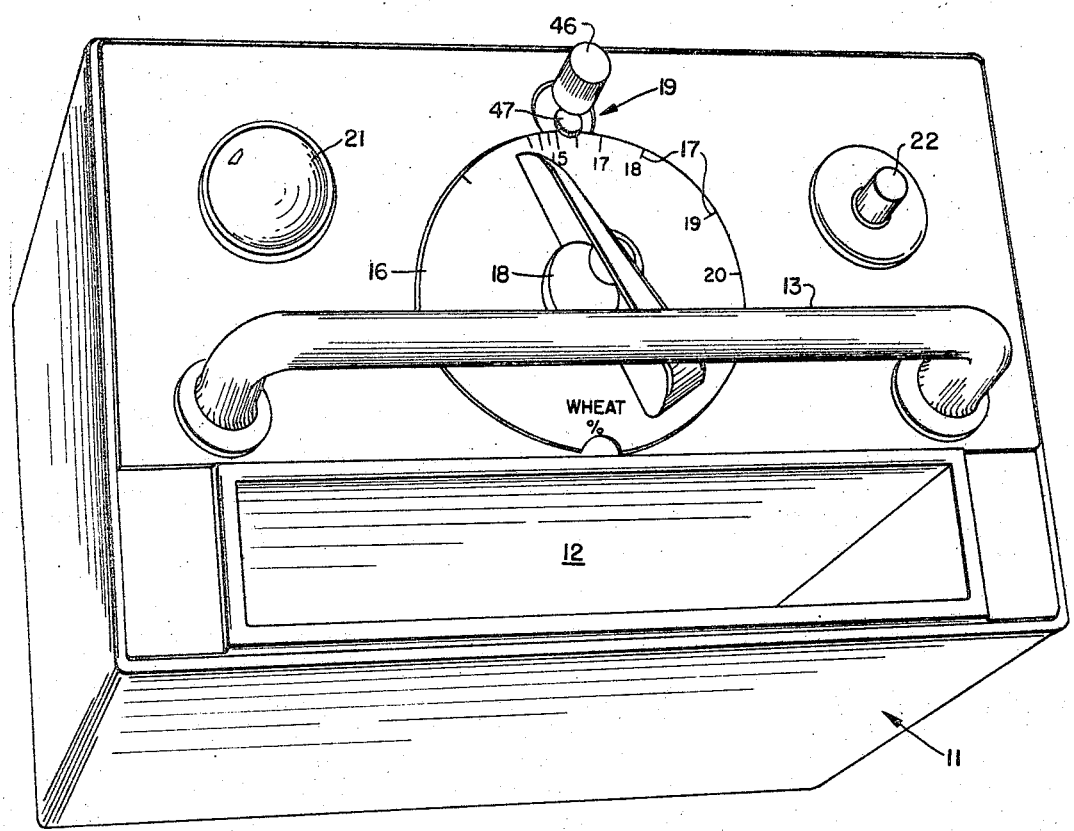
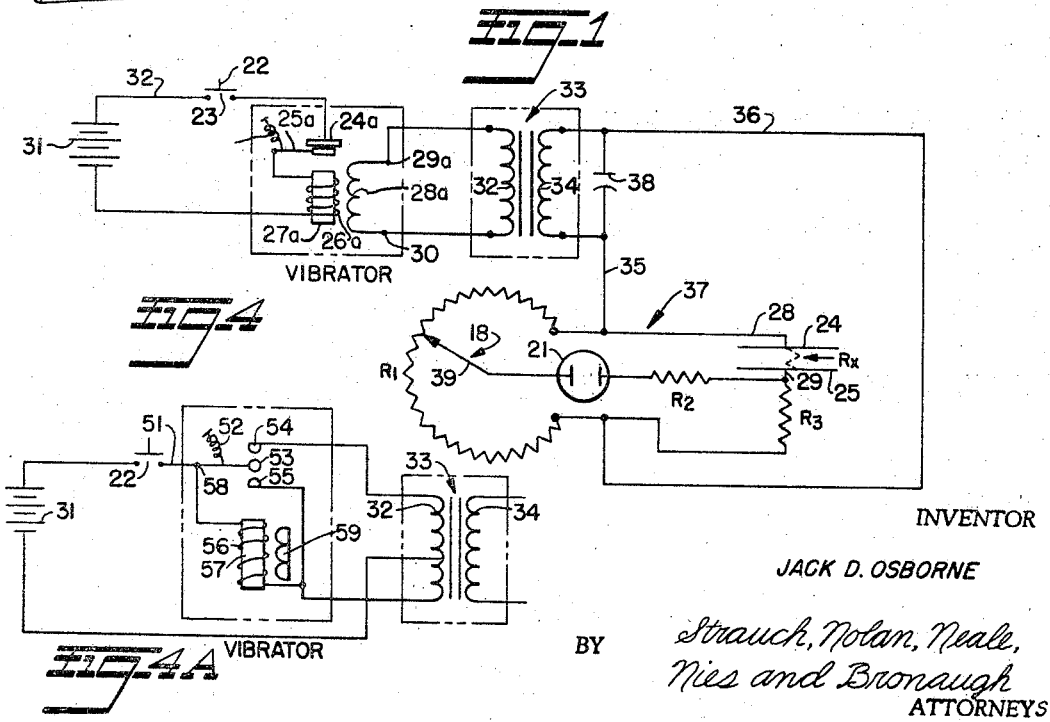
INVENTOR
JACK D. OSBORNE
BY Strauch, Nolan, Neale,
Nies and Bronaugh
ATTORNEYS

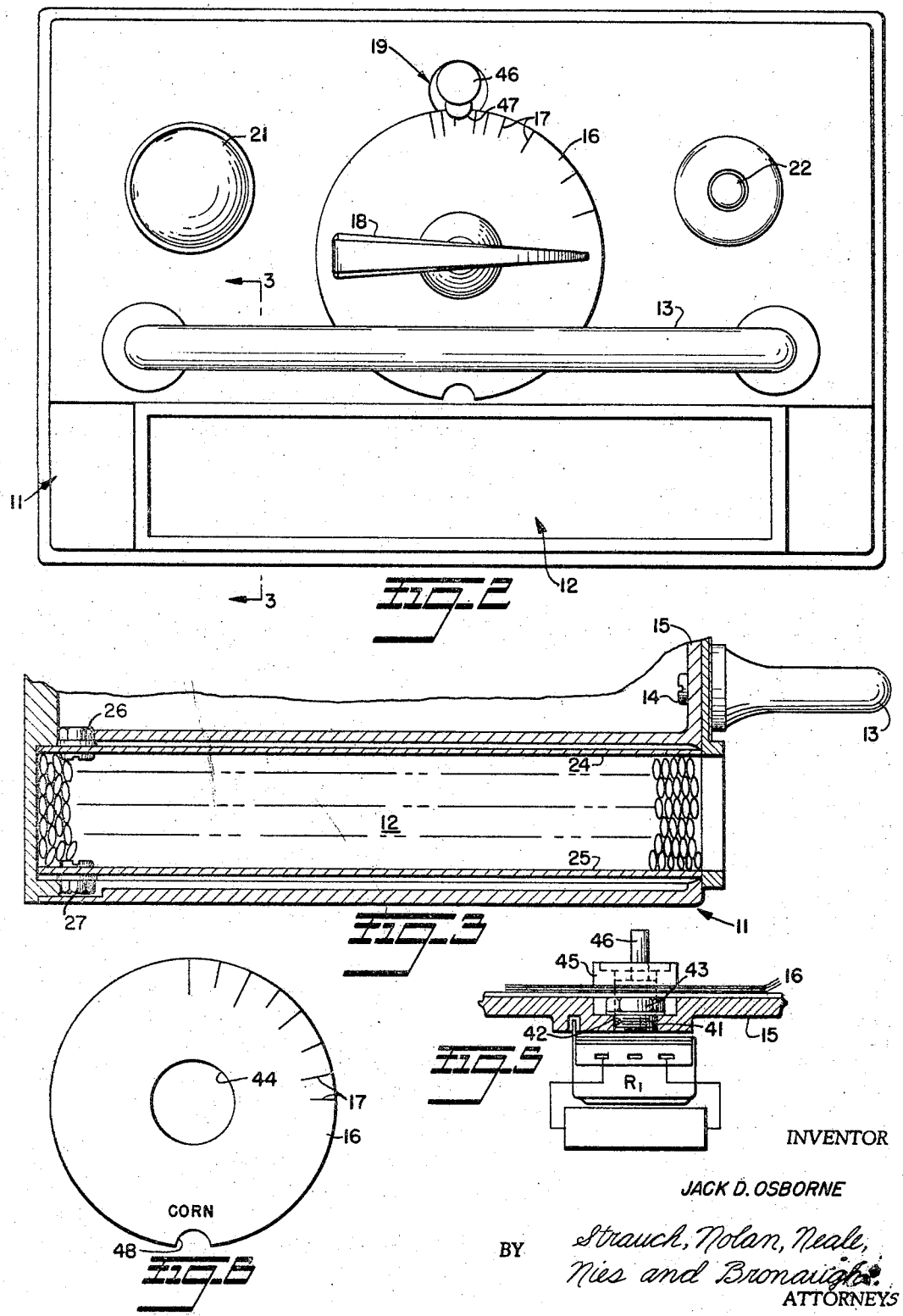

United States Patent Office 3,427,537
Patented Feb. 11, 1969

3,427,537
DIRECT MEASURING MOISTURE APPARATUS INCLUDING REPLACEABLE SCALE DIALS
Jack D. Osborne, Brighton, Mich., assignor to Skuttle Mfg. Co., Milford, Mich., a corporation of Michigan
Filed May 5, 1965, Ser. No. 453,380
U.S. Cl. 324—65          5 Claims
Int. Cl. G01r 27/02; G08b 21/00

ABSTRACT OF THE DISCLOSURE

A direct measuring moisture testing apparatus comprises a casing wherein grain to be tested is deposited in a recessed receptacle between spaced electrode plates forming part of a bridge circuit containing an adjustable potentiometer having an operating shaft extending above the casing top wall and mounting a pointer movable over an adjustably positioned and removable and replaceable scale dial secured to the top wall and calibrated directly in terms of moisture content for a particular grain in the receptacle. The circuit includes a gas discharge lamp indicator visible at the casing top wall.

---

This invention relates to apparatus for determining the moisture content of grains and like material, and is particularly concerned with a special relatively inexpensive uncomplicated instrument that may be operated on the farm by unskilled labor.

The market price of wheat, corn and like grains is determined in part by the amount of moisture in the grain.

Grains having moisture contents over certain values command lower prices. For example at current rates the loss to the farmer in selling 2000 bushels of wheat having an excess moisture content of only 0.6% is about sixty dollars. Also grains must be below certain permissible moisture content levels for safe storage. Hence it has become the practice for the farmer to dry his grain in preparation for storage or sale, but it is desirable that he does not overdry because apart from deterioration of food values the loss in weight will reduce his revenue. For example at current rates the loss to the farmer in selling 1600 bushels of wheat overdried by 3% is about sixty dollars. Also operation of the drying equipment is expensive and should be curtailed as much as possible.

Particularly at harvest time it is the practice of farmers to travel to large grain elevators or other central points with grain samples for testing the moisture content in apparatus available only there because it is relatively complex and expensive and difficult to operate. This requires time, and the sample may change during transit.

The present invention has for its major object a novel moisture tester which is so uncomplicated and inexpensive that it can be owned by the individual farmer, thus eliminating the need for his taking time to visit testing centers and enabling him to closely, frequently and more dependably check the moisture content of his grain.

Another object of the invention is to provide a novel moisture tester for grain or the like incorporating a special grain compartment for introducing a grain sample directly into a measuring circuit.

It is another object of the invention to provide a novel moisture tester wherein the moisture content of a grain sample is directly determined.

It is a further object of the invention to provide a novel grain moisture content testing device wherein the grain sample is placed between electrode plates in a bridge circuit for direct measurement.

A further object of the invention is to provide a novel dial mounting arrangement in a moisture testing device.

Further objects of the invention will appear as the description proceeds in connection with the appended claims and the annexed drawings wherein:

FIGURE 1 is a perspective view of a grain or like moisture testing instrument according to a preferred embodiment of the invention;

FIGURE 2 is a top plan view of the moisture tester of FIGURE 1 showing the controls and indicators;

FIGURE 3 is a fragmentary elevation partly in section on line 3—3 of FIGURE 2 showing the grain receiving chamber;

FIGURE 4 is a diagrammatic electrical circuit for explaining the invention;

FIGURE 4A shows an optional part of the electrical circuit;

FIGURE 5 is a fragmentary section showing the dial stack and knob pointer arrangements; and FIGURE 6 shows an individual grain moisture indicator dial.

The preferred structural embodiment of the moisture tester of the invention comprises a box-like casing 11 which houses the electrical components and provides an upwardly open grain receiving chamber indicated at 12.

Since the device is intended to be portable and self-contained, a suitable handle 13 is secured at opposite ends as by screws 14 to the casing cover 15.

Referring to FIGURE 1, the top cover bears a dial 16 which is non-rotatably secured in calibrated position and has indicator marks 17 around its periphery. A knob and pointer unit 18 is rotatably mounted centrally of the dial 16 to cooperate with marks 17. A dial clamping assembly is provided at 19 to lock the dial in a selected position of rotation about its axis during calibration as will appear.

Also carried by the cover are a neon test lamp and view window unit 21 and the pushbutton 22 of a switch 23, both shown in circuit in FIGURE 4.

The grain receiving chamber 12 is essentially an open top recess into the top of casing 11. Referring to FIGURE 3 it preferably extends substantially the depth of the casing and its opposite lateral sides are flat parallel metal electrode plates 24 and 25 which are cemented or otherwise secured to the casing walls. At their lower ends plates 24 and 25 carry terminals 26 and 27 to which are secured wires 28 and 29 respectively of the circuit of FIGURE 4.

Except for these wires 28 and 29, plates 24 and 25 are otherwise insulated from each other and metal parts of the casing. As will appear, the grain to be tested for moisture content will be deposited in chamber 12 to extend between plates 24 and 25 and this grain will become part of the FIGURE 4 circuit having a resistance value indicated at $R_x$ in FIGURE 4.

Referring to FIGURE 4, the circuit comprises a source of power such as a battery 31. One side of battery 31 is connected by lead 32 through switch 23 to a stationary vibrator terminal 24a. An oscillatable vibrator arm 25a is connected to coil 26a surrounding a stationary core 27a adapted to attract an armature on arm 25a when energized. An induction coil 28a adjacent coil 26a is connected to vibrator output terminals 29a and 30. A spring 31 biases arm 25a into contact with terminal 24a.

The vibrator operates in a conventional manner to produce a pulsating direct current voltage across terminals 29a and 30 when switch 23 is closed. When coil 26a becomes energized core 27a attracts arm 25a to break the circuit through arm 25a to the coil 26a. When the coil is deenergized arm 25a is released. Then spring 31 pulls back arm 25a to contact 24a reestablish the circuit. This is cyclically repeated while switch 23 is closed.

Terminals 29a, 30 are connected to the primary 32 of a transformer 33 having its secondary 34 connected by leads 35 and 36 to a bridge circuit 37. A capacitor 38 connected across the transformer secondary protects the vibrator against arcing.

The bridge circuit 37 has one side formed by a fixed resistance $R_3$ and the electrode plates 24 and 25 which with the grain in chamber 12 provide the unknown resistance $R_x$ to be measured by the bridge. The other side of the bridge is the variable potentiometer resistance $R_1$ having the movable arm 39 which is fixed to and rotates with knob 18. Arm 39 is connected through neon lamp unit 21 and a fixed resistance $R_2$ to provide the bridge wire for detecting balance. Resistance $R_2$ protects the lamp 21 for excess current. Potentiometer $R_1$ provides the known ratio resistance arms of the bridge.

It is also contemplated in some embodiment of the invention to provide, instead of the battery vibrator assembly and transformer shown, an electrical fitting including a transformer on the casing for plugging into a conventional 110 volt domestic alternating current circuit to provide a known A.C. voltage across the bridge circuit.

In operation of the apparatus as disclosed, it is only necessary to deposit a sample of the grain in chamber 12 so as to extend between plates 24 and 25, then press switch button 22 to close the circuit of FIGURE 4 and rotate knob 18 until the neon lamp unit 21 is extinguished. The point at 18 then indicates at 17 the moisture content of the particular grain directly.

It has been found that about 600 volts A.C. across the bridge circuit 37 will serve for normal purposes such as measuring the moisture content of corn, wheat, rye, rice and the like.

During the foregoing measurement, it is best to start with pointer 18 at zero on the moisture content scale of dial 16. Thus when the switch 23 is closed, if the lamp at 21 does not glow immediately the operator will know that the grain is already too dry. This also serves as a check on battery condition and if the lamp 21 does not glow the battery should be checked. The button 22 is held down while knob 18 is slowly rotated until lamp 21 stops glowing. Then button 22 is released and the operator reads the scale at 17 opposite pointer 18.

Referring to FIGURE 1 it will be seen that the device is set up to measure the moisture content of wheat. A separate dial 16 is provided for each grain, and sometimes separate dials for different types of the same grain.

Each dial is calibrated with the apparatus in the following manner. First obtain a sample of the corresponding grain of accurately known moisture content. This can be obtained at a local elevator or large installation where the more complex electronic moisture testers of Government standards are located. Deposit the known moisture content sample into chamber 12, and with button 22 depressed, rotate knob pointer 18 until the lamp at 21 is extinguished. Now check the indicated reading at 17 on the dial 16 which of course is selected to correspond to the grain under test. If the reading at 17 does not agree with the known value, rotate the dial 16 about its axis until pointer 18 indicates the correct value. Now lock the dial 16 against rotation and the apparatus is calibrated for that grain.

Referring to FIGURE 5 the potentiometer unit $R_1$ is mounted on the underside of cover 15 within a housing having a threaded extension 41 projecting through cover aperture 42 into a recess where a nut 43 clamps it to the cover. Above the level of the top cover surface extension 41 serves as a post to receive a stack of dials 16 each centrally apertured at 44 to be freely displaceable around the post. Each dial 16 bears markings 17 and a title corresponding to a different grain. A nylon or like washer 45 fits over the upper end of the post to engage the top dial 16, and the non-circular upper end of a shaft 46 connected to potentiometer arm 39. Pointer knob 18 is fixed upon shaft 46.

In practice the uppermost dial 16 of the stack represents the grain being tested. Should the operator decide to test corn instead of wheat in FIGURE 1, the knob 18 is removed, the dial stack rearranged until the corn moisture content graduated dial is uppermost, the knob replaced and then the device is calibrated for corn as above explained.

By providing a stack of differently calibrated disks the device is made substantially universal, and the disks are always carried on the casing in a position where they cannot be lost when not in actual use.

Any suitable device may be used for clamping and locking the dial stack in stationary condition after calibration. In the illustrated embodiment this device comprises a lock screw 46 threaded into a suitable socket in the casing cover for forcing a clamp lip 47 into engagement with the uppermost dial 16. During calibration the screw 46 is loosened to permit relocation of the uppermost dial and then tightened to lock the dial in calibrated position. A notch 48 is provided in each dial which when aligned with lip 47 enables the dial to be axially lifted off the post.

The invention provides therefore a simple portable inexpensive but reliable and accurate instrument which may be operated by unskilled farm labor. It represents a considerable saving of labor and money to the farmer. When battery operated it is entirely independent of the need for a separate power source, and when used in a barn in some embodiments it can be plugged into the nearest outlet. In some embodiments optional battery and external power connections may be provided.

The casing 11 completely encloses and seals the interior against entry of dust and water, and only the compartment 12 need be kept clean. There are no complex electrical circuits to get out of order or adjustment as in the sophisticated moisture testers at grain centers, and there are no ancillary cards to correlate to empirical readings on the scale as in current instruments. The dial plates bear direct moisture content values, and may have different scales in opposite sides, so that with a stack of four dials eight different grain scales are available.

Referring to FIGURE 4A the optional circuit includes battery 31 connected through test switch 22 to pivoted conductive vibrator arm 51 which is biased in one direction by spring 52. The other side of battery 31 is connected to a center tap of primary 32. The contact 53 at the end of arm 51 is disposed between fixed contacts 54 and 55 which are connected across the primary coil 32 of transformer 33. The vibrator primary coil 56 surrounding stationary core 57 is connected to arm 51 at 58 and to the contact 55. The secondary coil 59 of the vibrator is short circuited. To the right of transformer 33 the circuit is the same as in FIGURE 4.

Operation of the circuit of FIGURE 4A is essentially the same as FIGURE 4 except that in the FIGURE 4A form arcing at the vibrator contacts is reduced.

The apparatus of the invention is speedy in operation, requiring only about thirty seconds to obtain a direct measurement, and no temperature or other compensation factors need be considered provided the apparatus is not subjected to extremes of heat or cold. The apparatus disclosed weighs only about five pounds and is readily portable. Besides the stationary power sources above mentioned, the device may be provided with an attachment cord for plugging into the cigarette lighter or other 6–12 volt receptable found in the usual car, truck or tractor. The farmer may make frequent periodic checks on grain stored at the farm for detecting spoilage.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Apparatus for directly determining the moisture content of grain or like particulate material comprising a casing having a top wall provided with an opening, means providing a relatively deep open top material receiving receptacle in said casing below said opening with parallel electrode plates defining opposite sides of said receptacle and adapted to contact the material deposited therein, means providing an electrical resistance measuring circuit within said casing containing said electrode plates and including an adjustable resistance member having a rotatable shaft projecting above said top wall, an indicator member secured on said shaft, and a scale bearing element displaceably mounted above said top wall for movement relative to said shaft into a cooperative relative position with respect to said indicator member for calibrating the apparatus to measure the moisture content of a particular material, and a releasable fastening device on said top wall for locking said scale bearing element in said position during a moisture measuring operation, said scale being directly calibrated in terms of moisture content of the particular material to be tested, whereby during said moisture measuring operation said indicator member and said shaft are rotated to adjust said adjustable resistance member and balance said electrical measuring circuit, said material moisture content then bing determined directly from said scale.

2. The apparatus defined in claim 1, wherein said adjustable resistance is a potentiometer operated by said shaft and said indicator member is a pointer secured on said shaft to extend over said scale.

3. The apparatus defined in claim 1, wherein said scale bearing element is a dial mounted for rotatable displacement concentrically of said shaft and said fastening device is a dial clamp provided on said top wall for securing the dial in calibrated association with said indicator member.

4. The apparatus defined in claim 1, wherein said measuring circuit is a bridge circuit in which the adjustable resistance comprises two arms, a fixed resistance constitutes a third arm and said electrode plates with the material between them constitute the fourth arm, and a balancing indicator connected in said circuit including a gas discharge lamp visible at the top wall of said casing.

5. The apparatus defined in claim 1, wherein the scale bearing element associated with said indicator member is the top one of a stack of differently calibrated separate dials mounted upon said top wall concentrically of said shaft, each of said dials being adapted to be mounted in operative coaction with said indicator member when a corresponding grain is in the receptacle for measurement, and said fastening device locks the stack to said top wall.

References Cited
UNITED STATES PATENTS

| | | | |
|---|---|---|---|
| 1,961,965 | 6/1934 | Fisher | 324—65 |
| 2,043,241 | 6/1936 | Eyer | 324—61 |
| 2,076,441 | 4/1937 | Berry | 324—61 |
| 2,088,893 | 8/1937 | Davies | 324—65 |
| 2,349,992 | 5/1944 | Schrader | 324—57 |
| 2,461,286 | 2/1949 | Kline | 324—57 |
| 2,642,480 | 6/1953 | Shave | 324—65 XR |
| 2,759,148 | 8/1956 | Store | 324—65 |
| 3,068,404 | 12/1962 | Moore et al. | 324—65 |
| 3,226,635 | 12/1965 | Moe | 324—61 |

OTHER REFERENCES

Deere: "Moisture Meter", Operator's Manual, OM-N69–460, June 7, 1960, pp. 3–7.

RUDOLPH V. ROLINEC, *Primary Examiner.*

E. E. KUBASIEWICZ, *Assistant Examiner.*

U.S. Cl. X.R.

340–235